(12) United States Patent
Drouot et al.

(10) Patent No.: US 9,976,805 B2
(45) Date of Patent: May 22, 2018

(54) PROCESSING SYSTEM INTENDED TO DEHYDRATE FOOD WASTE

(71) Applicant: Société SERVECO (SA), Saint-Gaultier (FR)

(72) Inventors: Louis Drouot, Moret-sur-Loing (FR); Jean-Jacques Mulleris, Neuilly sur Seine (FR)

(73) Assignee: SOCIÉTÉ SERVECO (SA), Saint Gaultier (FR)

( * ) Notice: Subject to any disclaimer, the term of this patent is extended or adjusted under 35 U.S.C. 154(b) by 354 days.

(21) Appl. No.: 14/897,452

(22) PCT Filed: Jun. 11, 2014

(86) PCT No.: PCT/EP2014/062164
§ 371 (c)(1),
(2) Date: Dec. 10, 2015

(87) PCT Pub. No.: WO2014/198795
PCT Pub. Date: Dec. 18, 2014

(65) Prior Publication Data
US 2016/0131427 A1     May 12, 2016

(30) Foreign Application Priority Data

Jun. 13, 2013  (FR) ...................... 13 55487
Sep. 27, 2013  (FR) ...................... 13 59330

(51) Int. Cl.
*F26B 25/00* (2006.01)
*B09B 3/00* (2006.01)
(Continued)

(52) U.S. Cl.
CPC .......... *F26B 25/005* (2013.01); *B01D 5/0027* (2013.01); *B01D 5/0039* (2013.01);
(Continued)

(58) Field of Classification Search
CPC ........ F26B 25/005; F26B 11/12; F26B 11/14; F26B 2200/02; F26B 2200/04;
(Continued)

(56) References Cited

U.S. PATENT DOCUMENTS 6,752,956 B1 *   6/2004  Vanderwal ............. A61L 11/00
                                                    366/149
8,561,314 B2 *  10/2013  Kruger ................... B01F 7/088
                                                    34/185
(Continued)

FOREIGN PATENT DOCUMENTS

JP    2004262720 A    9/2004
JP    2008284483 A   11/2008
(Continued)

OTHER PUBLICATIONS

International Search Report for corresponding International Application No. PCT/EP2014/062164, dated Sep. 22, 2014.

*Primary Examiner* — Jessica Yuen
(74) *Attorney, Agent, or Firm* — Hauptman Ham, LLP (57) ABSTRACT

The present invention relates to a processing system (0) intended to dehydrate food waste (4) comprising at least one device (200) for storing and heating food waste (4) comprising at least one device for stirring the food waste (4), a direct contact heat exchange condenser (34) comprising an opening (37) for extracting incondensable gases from the condenser (34), a first pipe (3) allowing direct communication between the storage device (200) and the condenser (34) to allow the passage of gaseous effluents (22) particularly comprising steam, produced by the heating of said food waste (4) in the waste storage and heating device (200), to the direct contact heat exchange condenser (34), where the steam condenses in contact with a shower of the coolant liquid. The recycling of heat between the condenser (34) and
(Continued)

the device (200) for storing and heating food waste is provided by a heat pump (6).

16 Claims, 4 Drawing Sheets

(51) Int. Cl.
*B01D 5/00* (2006.01)
*F26B 11/14* (2006.01)
*F26B 11/12* (2006.01)

(52) U.S. Cl.
CPC ............ B09B 3/0083 (2013.01); *F26B 11/12* (2013.01); *F26B 11/14* (2013.01); *F26B 2200/02* (2013.01); *F26B 2200/04* (2013.01); *Y02B 30/52* (2013.01); *Y02P 60/853* (2015.11)

(58) Field of Classification Search
CPC .. B09B 3/0083; B01D 5/0027; B01D 5/0039; Y02B 30/52; Y02P 60/853
See application file for complete search history.

(56) References Cited

U.S. PATENT DOCUMENTS

2005/0000108 A1* 1/2005 Ragnarsson ............ F26B 5/041
34/92
2010/0132210 A1 6/2010 Kruger

FOREIGN PATENT DOCUMENTS

| KR | 100759795 B1 | 10/2007 |
| KR | 20110016609 A | 2/2011 |
| WO | 2008/089931 A1 | 7/2008 |

\* cited by examiner

PROCESSING SYSTEM INTENDED TO DEHYDRATE FOOD WASTE

TECHNICAL FIELD OF THE INVENTION

The present invention relates to the field of waste treatment, and more particularly a method allowing dehydration of food waste.

TECHNICAL BACKGROUND OF THE INVENTION

The treatment of food waste is an important challenge for certain industrial concerns and certain commercial firms such as large shopping centers.

Statutes now require that waste produced by them be taxed based on weight. The current tendency is therefore to reduce the weight of the waste produced.

Several methods are possible, comprising methods for drying the waste.

Document WO 2009/139514 teaches a system for drying food waste. The food waste is stored in a first container heated by an oil bath to 80° C. and comprising a device for stirring the waste and for supplying hot air. The steam created by heating the food waste in the container mixes with hot air. These gaseous effluents are discharged with a pipe. Then they pass into a filter to reach an indirect-contact condenser. The condenser comprises a plurality of cooling pipes and a plurality of fans. The effluents are then condensed in the condenser in order to store the condensate obtained in an additional container. The incondensable effluents are pumped by a pump to be deodorized, then mixed with outside air and heated to be reintroduced into the first container. The system described in this document uses many devices such as filters, deodorizers, catalysts, etc. These devices require much upkeep with considerable maintenance. In addition, the system as a whole consumes a large quantity of energy compared to the quantity of waste treated.

Document WO 2005/099920 teaches a system for treating food waste. This device also comprises a plurality of devices such as filters, a condenser, a heat exchanger, a radiator, a catalyst, a deodorizer, an ozone generator, etc. Moreover, the operating temperatures of the system can rise to 800° C. in certain parts of the system. The high temperatures as well as the operation of the many devices used require considerable consumption of energy and considerable maintenance.

Document EP 1 821 054 also teaches a system for treating food waste. The food waste is stored in a container comprising stirring means. The gaseous effluent is aspirated into an air-circulating fan. A portion of the waste is re-introduced into the container after passing through heating means. The other portion of the effluent is aspirated by a an exhaust fan after having been deodorized by a deodorizer and a heating means that heats the effluent up to a temperature of 350° C. In the same manner as in the foregoing documents, the system of this document requires considerable consumption of energy even if the number of devices is smaller. In addition, the recirculation of effluent into the container makes the system ineffective.

Document JP 2008-284483 teaches a device for drying waste. This device comprises a container for treating waste, a heating device, a vacuum pump. A device for cooling the gases generated in the container and a cyclone separator to discharge the gasified components such as water and fats are positioned between the container and the vacuum pump. This device requires several systems such as a cyclone separator and a cooling device which require considerable maintenance.

GENERAL DESCRIPTION OF THE INVENTION

The present invention has as its object to obtain a simple, economical and reliable waste treatment system which compensates for one or more of the difficulties mentioned previously.

To this end, the invention relates to a treatment system intended to dehydrate food waste comprising at least:
a storage and heating device for food waste comprising at least a stirring device for food waste in a container,
the system being characterized in that it further comprises:
a condenser using direct contact heat transfer having an enclosure comprising an extraction opening for incondensable gases in the upper portion of the condenser and an extraction opening for condensates in the lower portion of the condenser,
a first pipe allowing direct communication between the storage device and the condenser to allow passage of the gaseous effluent, comprising steam produced in the storage and heating device by the food waste, toward the direct contact heat exchange condenser, where the steam contained in the gaseous effluent is condensed,
the inside of the container, the interior of the enclosure of the condenser and the inside of the first pipe being maintained under rough vacuum.

According to another feature, the direct contact heat exchange condenser is a jet condenser comprising the enclosure having a longitudinal axis perpendicular to the ground, the enclosure comprising, in the upper portion of the enclosure, a shower device comprising at least one opening for admitting cooling liquid, allowing the cooling liquid to fall as a shower within the enclosure, from the upper portion to the lower portion, the condensate made up of cooling liquid added with the steam condensed by the cooling liquid being extracted by the condensate extraction opening, the first pipe leading into the lower portion of the enclosure.

According to another feature, the incondensable gas extraction opening of the condenser is connected to an incondensable extraction pump and the condensate extraction opening being connected to a condensate extraction pump.

According to another feature, the shower device communicates with the lower portion of the condenser enclosure through a second pipe, a portion of the condensates being extracted from the lower portion of the enclosure by a condensate recirculation pump to be brought to the shower device by this second pipe.

According to another feature, the device of waste storage and heating further comprises:
a container intended to contain the food waste, whose shape is partly cylindrical sector,
a heating device positioned against the wall of the container and intended to heat the food waste contained in the container,
According to another feature, the stirring device comprises at least:
a rotating shaft driven by a motor and parallel to the longitudinal axis of the cylindrical sector portion of the container,
a plurality of stems of which one end is attached to the rotating shaft, a plurality of blades fixed to the other end of the stems so that the assembly made up of a stem and of a blade extends from the rotating shaft to the vicinity of the wall of the cylindrical sector wall of the container.

According to another feature, the longitudinal axis of the container is inclined with respect to the ground, and each blade is contained in a plane forming an angle δ with the plane comprising the rotating shaft and the stem on which the blade is fixed, the orientation of the angle δ being selected so that the food waste intended to be treated in the system is lifted in the direction of the end of the rotating shaft which is the most remote from the ground during treatment of the food waste.

According to another feature, the heating device comprises heating plates applied on the outer surface of the container, the heating plates being controlled in temperature by a regulator.

According to another feature, the heating device further comprises a heat pump whereof one specific condenser is attached to the container and whereof a specific evaporator is attached to the enclosure of the condenser and/or on the second pipe to recover the heat of the condenser enclosure and/or of the second pipe, to restore it to the container.

According to another feature, the heating device further comprises a heat pump whereof a specific condenser is attached to the container and whereof a specific evaporator is inside the enclosure of the condenser.

According to another feature, the portion of the first pipe closest to the enclosure of the condenser forms an acute angle α with the longitudinal axis of the enclosure.

According to another feature, the primary vacuum is maintained by the pump for extracting incondensable gas from the condenser and/or the condensate extraction pump.

According to another feature, the system further comprises a moisture sensor attached inside the container, the sensor being connected to a control means, the control means being connected to the motor driving the rotating shaft, the extraction and/or circulation pump(s), the heating device and the heat pump, the control means stopping the motor of the rotating shaft, the heating device, the extraction and/or circulation pump(s) and the heat pump when the sensor detects a moisture level in the food waste less than a minimum moisture level in the container.

According to another feature, the system comprises at least one pressure sensor in the container and/or in the condenser enclosure, the sensor(s) being connected to the control means, the control means being connected to at least one extraction pump, the control means controlling the operation of the extraction pump(s) to maintain the primary vacuum of the system and/or discharge the condensate.

According to another feature, the container has a discharge opening in the portion nearest to the ground.

According to another feature, cutters are attached to the rotating shaft.

The invention, with its features and advantages, will be revealed more clearly upon reading the description made with reference to the appended drawings wherein.

DESCRIPTION OF THE PREFERRED
EMBODIMENTS OF THE INVENTION

The description hereafter will refer to the figures mentioned above.

The invention relates to a system (0) intended to treat food waste (4).

The food waste (4) can be waste rejected, for example and without limitation, by the food industry, by the food trade, from large shopping centers or from restaurants.

The food waste (4) can comprise organic waste and non-organic waste coming, for example, from food packaging which can be made of plastic, of glass, of metal, etc.

The system (0) comprises a storage and heating device (200) for food waste (4).

The storage and heating device (200) comprises a container (2) wherein the food waste (4) to be treated is contained. A stirring device makes it possible to stir the waste contained in the container (2).

The container (2) has a shape that is in part a cylindrical sector. The container (2) can be made of stainless steel or of black steel, or of any other material compatible with the waste and its heating.

The stirring device comprises a rotating shaft (17) driven by a motor (18). The rotating shaft (17) is parallel to the longitudinal axis (32) of the complete cylinder of which one sector forms the container (2). Preferably, the axis (31) of the rotating shaft (17) and the longitudinal axis (32) of the complete cylinder are the same. The motor (18) which drives the rotating shaft (17) is located outside the container (2). The rotating shaft (17) extending on either side of the container (2) passes through the wall of the container (2) to be connected to the motor (18). Sealing means are used at the place (21) where the rotating shaft (17) passes through the container (2) wall so that the food waste (4) does not leave the container (2) once it is inside, particularly liquid matter contained in the food waste (4), and to maintain a primary vacuum.

The stirring device further comprises a plurality of stems (20) and a plurality of blades (19). One end of each stem (20) is attached to the rotary shaft (17). The blades (19) are attached to the other end of the stems (20). The assembly made up of a stem (20) and a blade (19) extends from the rotary shaft (17) to the vicinity of the wall of the container (2) in the shape of a cylindrical sector. The length formed by the assembly consisting of a stem (20) and a blade (19) is substantially smaller than the radius of the complete cylinder of which one sector constitutes the container (2) so that the blades (19) do not rub against the inner wall of the portion of the container (2) shaped like a cylindrical sector.

The rotating shaft (17) turns at a slow rotation speed. The rotation speed of the rotating shaft (17) of the stirring device is equal, for example, to 7.5 revolutions per minute.

The storage and heating device (200) further comprises a heating device (11) intended to heat the food waste (4) in the container (2) to allow the extraction of water from the waste in the form of steam. The heating device (11) for the waste can be adjusted between 50° C. and 100° C. A preferred temperature of the waste can be equal to 80° C. In this case the heating device (11) can be preferably adjusted to 100° C. to take into account the heat gradient in the walls of the container (2).

The heating device (11) can be positioned in the bottom of the container (2). The heating device (11) can comprise heating plates (11*a*) or a heat restorer (11*b*) extracted from a heat pump (6) or even a combination of heating plates (11*a*) and the heat restorer (11*b*).

The heating plates (11a) of the heating device (11) supply heat (25a) to the container (2). They can be flexible heating plates applied to the outer surface of the container (2), preferably on the lower portion of the cylindrical sector. These heating plates have in their structure at least one electrical element forming a heating resistor buried in a flexible, thermally conductive and electrically insulating material which can be made of silicone or any other polymer, such as elastomers, having similar properties. This heating electrical resistor is supplied by at least one electrical supply means so as to allow it to supply power comprised between 100 W and 10,000 W depending on the volume of the container to be heated. According to one embodiment, the heating plates used are temperature regulated and/or supplied with power on-and-off.

The heat restorer (11b) of the heating device (11) can be a specific condenser connected to a heat pump (6). The heat pump (6) is, on the one hand, connected to the container (2), and on the other connected to at least one heat recovery (7, 8) such as a specific evaporator connected to the enclosure (35) of the condenser (34) and/or to the second pipe (5) for recovering (23, 24) heat from the enclosure (35) and/or from the second pipe (5), then restore it (25b) at a higher temperature to the container (2) through the specific condenser (11b) of the heat pump. This heat pump can for example be of the supercritical carbon dioxide type. Selecting this cycle makes it possible to be compatible with a preferred specific evaporator (7, 8) temperature of 15° C., for example, and a preferred specific condenser (11b) temperature of 100° C. for example, in contact with the wall of the container (2). The specific condenser of the heat pump (6) is attached to the container (2) at its lower portion, instead of or next to the aforementioned flexible heating plates.

Figure 5:
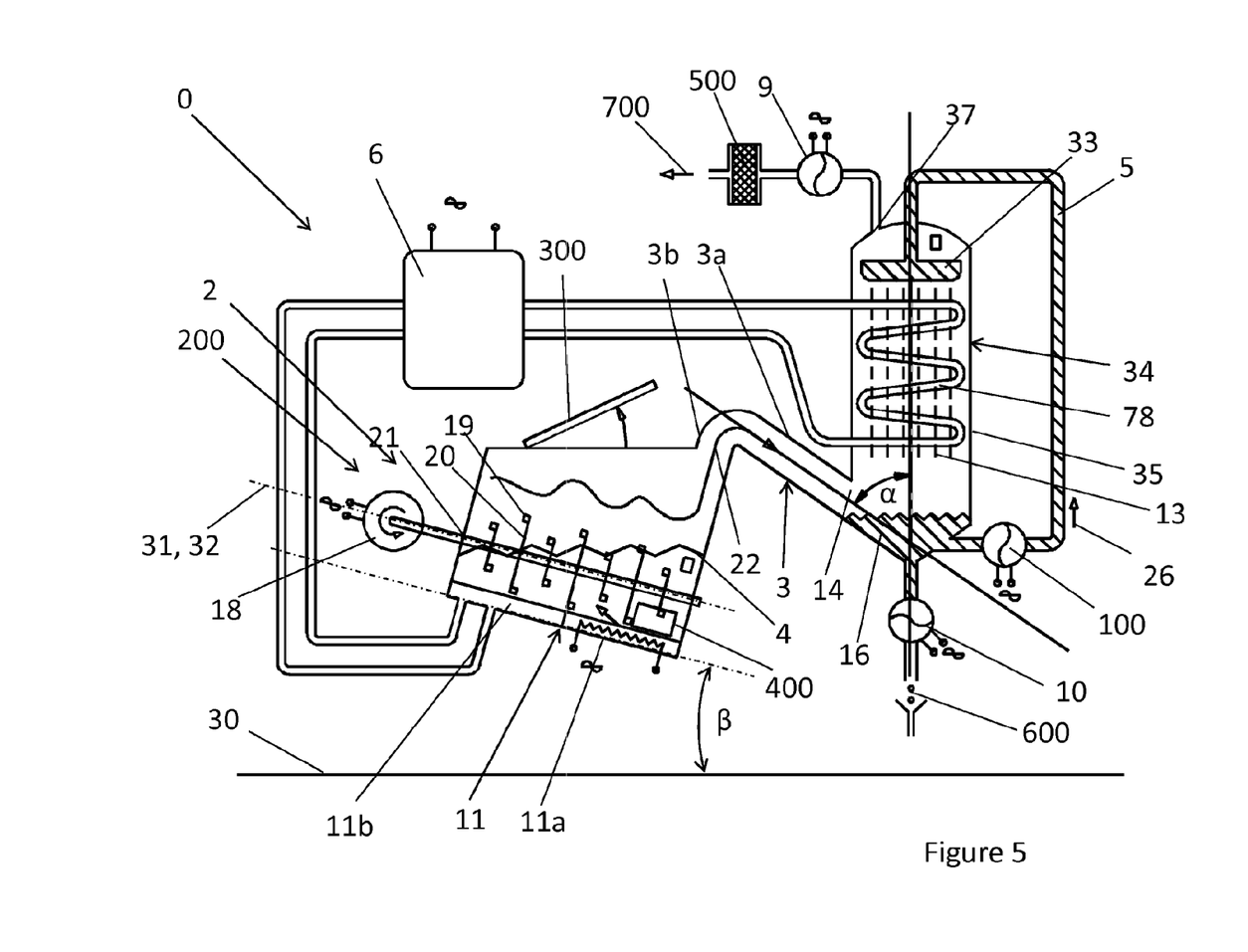
FIG. 5 shows a schematic view of the system according to another embodiment.

In another embodiment shown in FIG. 5, the heat recovery (78) is inside the enclosure (35) of the condenser (34) to recover the heat inside the enclosure (35), then restore it (25b) at a higher temperature to the container (2) through the specific condenser (11b) of the heat pump. This configuration makes it possible to improve the degree of heat recovering and thus to improve the efficiency of the system. The heat recovery (78), such as a specific evaporator, can be in the form of a serpentine pipe.

Figure 1:
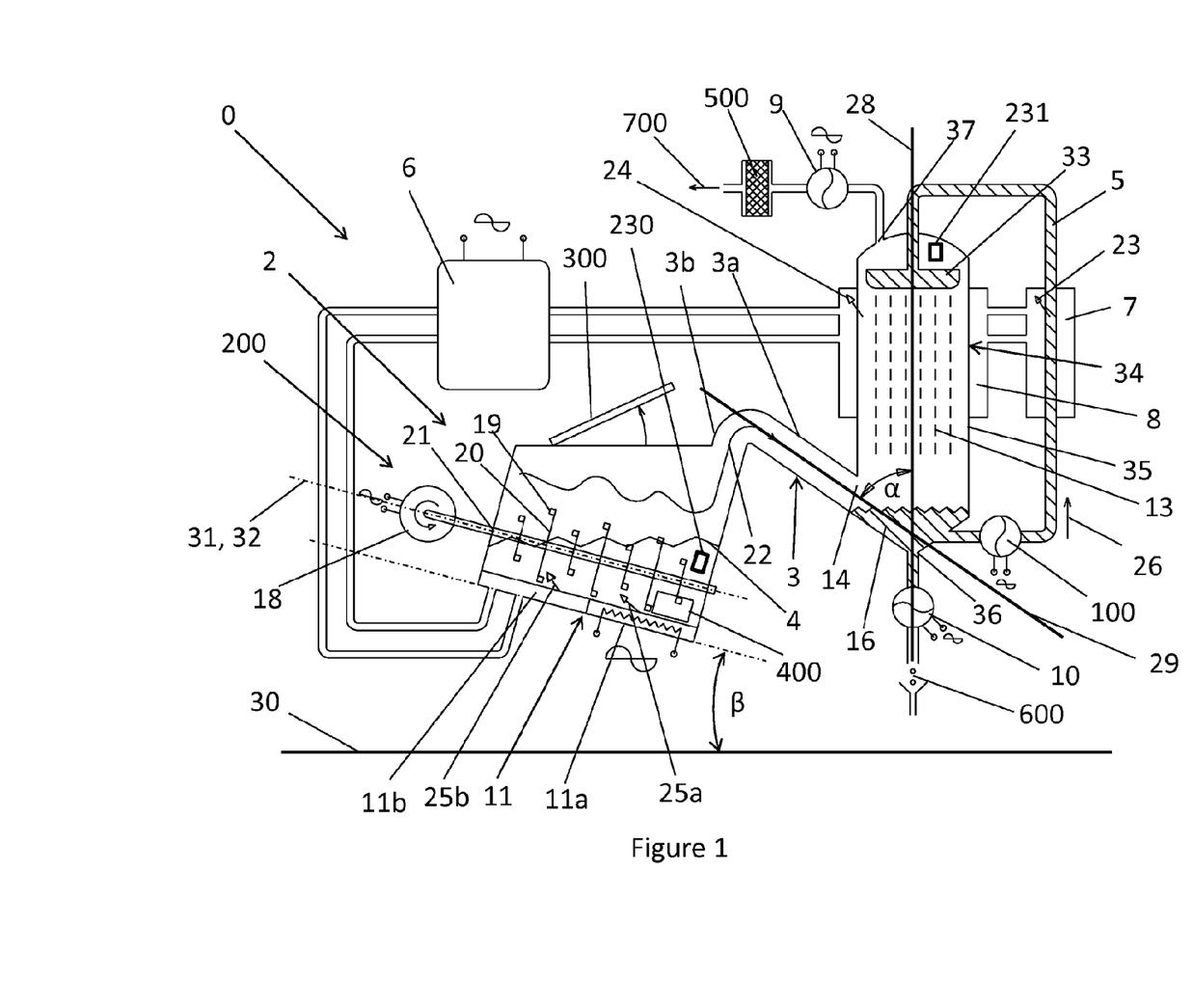
FIG. 1 shows a schematic view of the system according to one embodiment.
Figures 2, 3:
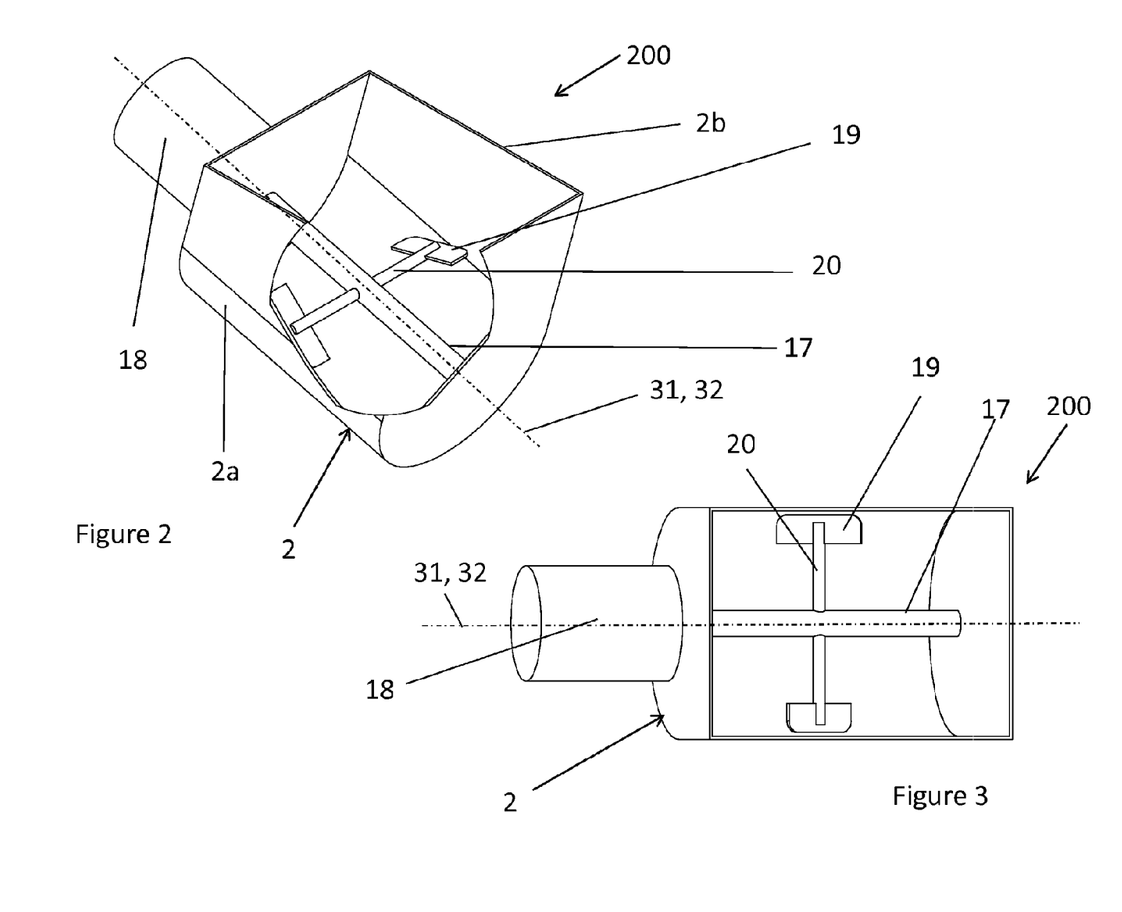
FIG. 2 shows a cutaway drawing of the storage and heating device without the cover in a perspective view.
FIG. 3 shows a top view of the storage and heating device without the cover.
Figure 4:
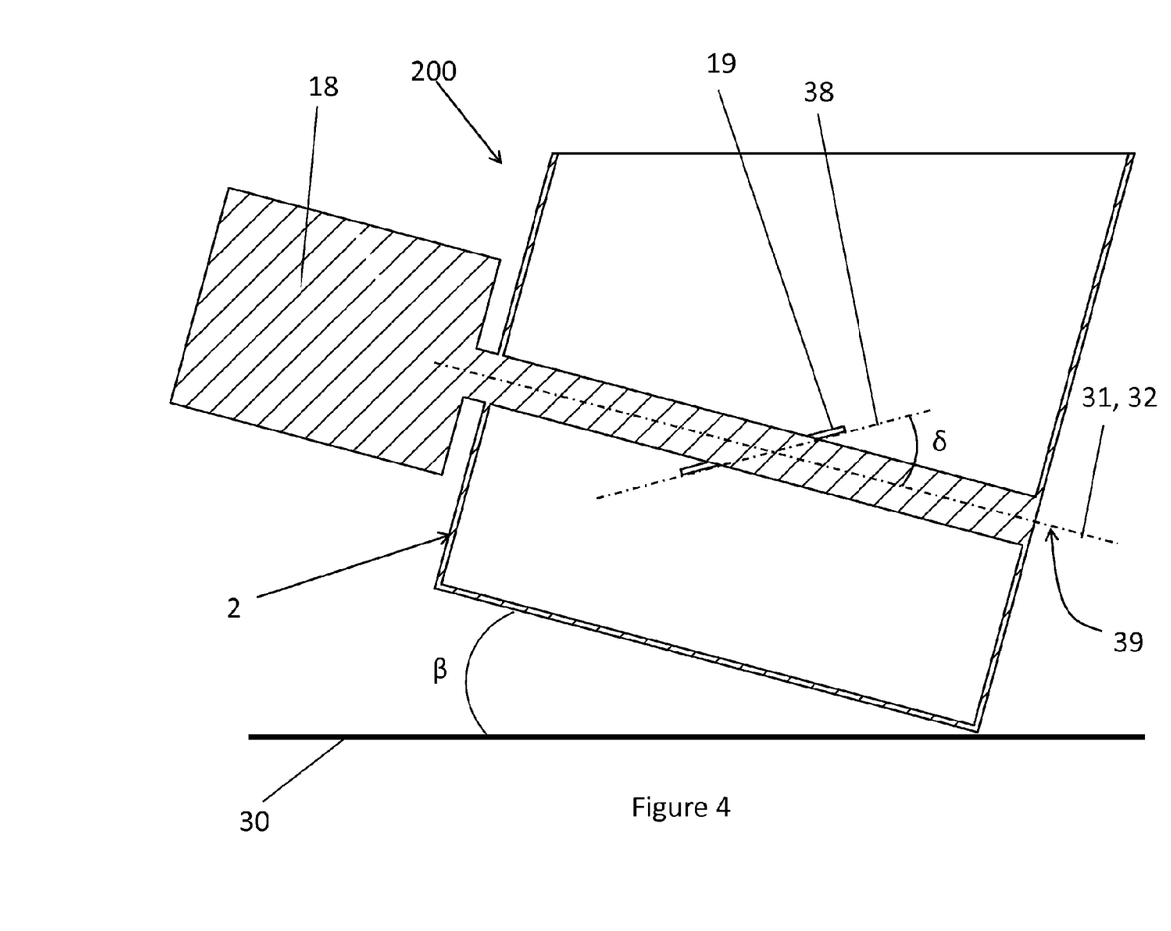
FIG. 4 shows a transverse section of the storage and heating device along the axis of the rotating shaft.

According to a preferred embodiment of the storage and heating device (200) shown in FIG. 1, the portion (2a) of the container (2) in the form of a cylindrical sector is a half-cylinder of which the longitudinal axis (32) is inclined with respect to the ground (30) by an angle $\beta$, preferably comprised in an interval between 0° and 30°, more preferably equal to 15°. In this embodiment, the container (2) can also comprise a portion (2b) on top of the half-cylindrical portion (2a) having the shape of a straight prism of which the base is a right-angled trapezoid. The angle made by the opposed non-parallel straight lines of the rectangle is equal to $\beta$. The assembly comprising the half-cylindrical portion (2a) and the portion (2b) forming a straight prism forms the container (2). The container (2) is closed by a cover (300) on the upper face of the portion (2b) having the shape of a straight prism opposed to the half-cylindrical portion. The cover can be opened, for example, for loading food waste (4) into the container (2). The cover can be closed, for example during operation of the system (0).

In this embodiment, each blade (19) is contained in a plane (38) forming an angle $\delta$ with the plane (39) comprising the rotating shaft (17) and the stem (20) to which the blade (19) is attached. The angle $\delta$ is for example preferably comprised between 0° and 60°, more preferably equal to 30°. The angle $\delta$ can generally equal the angle $\beta$. The orientation of the angle $\delta$ is selected in such a way that the food waste (4) intended to be treated in the system (0) is lifted in the direction of the end (21) of the rotating shaft (17) farthest from the ground (30) during treatment of the food waste (4) during operation of the system (0) for treatment of the food waste (4). This makes it possible to avoid having the food waste (4) remain accumulated in the portion of the container (2) nearest the ground (30) by gravity, which would make the operation of the stirring device ineffective.

In this embodiment, the motor (18) driving the rotating shaft (17) is placed at the end of the rotating shaft (17) farthest from the ground.

The inclination of the longitudinal axis (31) of the half-cylindrical portion (2a) of this embodiment prevents the food waste (4) from reaching the sealing means used at the point (21) where the rotating shaft (17) passes through the wall of the container (2). Indeed, the food waste (4) can damage the sealing means by chemical or physical reactions occurring during treatment of the food waste (4).

For all the embodiments of the storage and heating device (200), the container (2) can have a discharge opening (400) in the portion closest to the ground of the cylindrical sector. This discharge opening (400) is normally closed during drying of the waste, it is open for discharging dry waste.

In this embodiment, the rotating shaft (17) of the stirring device turns in a direction of rotation allowing the food waste (4) to be lifted due to the angle $\delta$ formed by the blades (19) with the plane (39) comprising the rotating shaft (17) and the stem (20) to which the blade (19) is attached. In an opposite rotation direction of the rotating shaft (17), the remainder of the dried food waste (4) after treatment can be easily discharged through the discharge opening (400) thanks to the blades (19) of the stirring device which push the remainder toward the discharge opening.

The rotating shaft (17) can also comprise cutters attached to the rotating shaft (17). These cutters make it possible to shred the elements contained in the food waste (4) capable of wrapping themselves around the rotating shaft (17), which impairs the operation of the stirring device by blocking or slowing down the rotation of the rotating shaft (17). The elements contained in the food waste (4) capable of wrapping themselves around the rotating shaft (17) can for example be plastic elements such as plastic packaging, plastic films or plastic bags.

The system (0) intended for treating food waste (4) further includes a direct contact heat exchange steam condenser (34). A heat exchange by direct contact is an exchange wherein no material separation exists between two fluids which are exchanging their heats.

The direct contact heat exchange condenser (34) can be a jet condenser wherein the cooling liquid, cold water for example, enters into direct contact with the steam contained in the gaseous effluent (22) produced by the food waste (4) which is then condensed by contact with this liquid. The temperature of the cooling liquid is greater than 0° C. and less than 30° C. It is preferably 15° C., for example.

This jet condenser comprises an enclosure (35) having a longitudinal axis (28) substantially perpendicular to the ground (30). The longitudinal axis (28) of the enclosure (35) can have an angle less than 5° with respect to the vertical. The elements of the jet condenser can be made of stainless steel or of black steel, or of any other material compatible with the temperatures and pressure in the condenser, for example high temperature PVC.

In an upper portion of the enclosure (35), a shower device (33) comprising at least one cooling liquid (16) entry opening allows the cooling liquid (16) to fall as a shower (13) into the enclosure (35) from the upper portion toward a lower portion.

The enclosure (35) further comprises, in the lower portion, an opening (36) for extracting the condensate (600) composed of cooling liquid (16) and of steam from the gaseous effluent (22) condensed by the cooling liquid (16).

The shower device (33) can communicate with the lower portion of the enclosure (35) of the condenser (34). A portion of the condensate is extracted from the lower portion of the enclosure (35) by a condensate recirculation pump (100) to be led to the shower device (33).

The enclosure (35) further comprises, in the upper portion, an extraction opening (37) for incondensable gases (700) contained in the gaseous effluents (22) which are extracted by an incondensable extraction pump (9).

The opening (37) for extracting incondensable gases can further comprise an activated carbon filter (500) to deodorize the incondensable gases or a splash system coupled with an activated carbon filter. A catalytic converter can also be used for deodorizing.

The system (0) intended for treating food waste (4) further includes a first pipe (3) allowing direct communication between the storage device (200), more particularly the container (2), and the condenser (34), to allow passage of gaseous effluents (22) composed of steam and of incondensable gases produced by heating the food waste (4) in the container (2) toward the direct contact heat exchange condenser (34). The first pipe (3) can be made of stainless steel or black steel, or any other material compatible with the levels of temperature and pressure, for example high temperature PVC.

This first pipe (3) leads into the lower portion of the enclosure (35) through a gas introduction opening (14). A first portion (3a) of the first pipe (3) closest to the enclosure (35) has a longitudinal axis (29) which forms an acute angle α with the longitudinal axis (28) of the enclosure (35) of the condenser (34) by forming, for example, an elbow between the enclosure (35) of the condenser (34) and the first pipe (3). The acute angle α can be comprised in an interval comprised, for example, between 30° and 60°. The end of the first portion (3a) of the first pipe (3) opposite to the end attached to the enclosure (35) of the condenser (34) extends, moving away from the ground (30), until it attains a height greater than the height of the opening (14) for introducing the gaseous effluent (22). This end then joins a second portion (3b) of the second pipe which connects the first pipe (3) to the container (2) of the waste storage and heating device (200).

The inside of the enclosure (35) of the condenser (34), the inside of the container (2) and the first pipe (3) are airtight and maintained in a primary vacuum, for example between 1 bar and 0.001 bar, preferably at 0.7 bar. The primary vacuum in the system (0) allows, among other things, to contain the bad odours inside the system (0). This airtightness also makes it possible to prevent the entry of outside air so as to avoid undesirable oxidations of elements of the system (0). Finally, the primary vacuum also makes it possible to reduce the evaporation temperature of the water contained in the waste to below 100° C., which saves heating energy.

The water condensate collected at the bottom of the enclosure (35) is extracted by at least one condensate extraction pump (10).

In one variant embodiment, this condensate extraction pump (10) is, for example, coupled to the same shaft as the incondensable extraction pump (9).

In another variant embodiment, the pumps (9) and (10) are the same. In this other variant embodiment, the incondensable extraction pump (9) is a liquid ring pump. Thus the condensate extracted and collected at the bottom of the enclosure (35) of the condenser is used by the liquid ring of the incondensable extraction pump (9).

In another variation, the condensate and cooling liquid recirculation pump (100) can be coupled with the incondensable extraction pump (9) and/or the condensate extraction pump (10).

The system (0) can further comprises a moisture sensor (230) attached inside the container (2). This sensor (230) can be connected to a control means connected at least to the motor (18) driving the rotating shaft (17). The control means can also be connected at least to the extraction and/or recirculation pump(s) (9, 10, 100), to the heating device (11a) and/or to the heat pump (6). The control means stops the motor (18) of the rotating shaft (17) and the entire system (0) when the sensor (230) detects a level of moisture less than a minimum moisture level value of the food waste (4) in the container (2), comprised for example of between 10% and 20% moisture. What is meant by stoppage of the entire system (0), is all of the elements, comprising the rotating shaft (17), the incondensable extraction pump (9), the condensate extraction pump (10), the recirculation pump (100), the heating device (11) and the heat pump (6).

The system (0) can comprise at least one pressure sensor (231) in the container (2) and/or in the enclosure (35) of the condenser (34). The sensor(s) (231) can be connected to the control means. The control means is connected to at least the incondensable extraction pump (9). The control means thus controls the operation of the incondensable extraction pump (9) to maintain the primary vacuum of the system (0).

The primary vacuum can be maintained by at least the incondensable extraction pump (9). The condensate extraction pump (10) can also participate in maintaining the primary vacuum.

The system (0) according to the invention makes it possible to treat food waste (4) by dehydration.

The user of the system (0) opens the cover (300) of the container (2) to load food waste (4) into the container (2), then closes the cover.

A primary vacuum is created in the system (0) after the cover is closed by starting the extraction pumps (9) and (10). The recirculation pump (100) is started to draw the cooling liquid toward the shower device (33).

The stirring device and the heating device of the storage and heating device are put into operation.

Incondensable gases of air for example, possibly present in the enclosure (35) of the condenser during starting are discharged by the incondensable (9) extraction pump. The temperature and the pressure in the enclosure (35) of the condenser (34) are then lower than the temperature and the pressure outside the container (2). This creates a vacuum which allows the gaseous effluents (22), comprising in particular steam, produced by heating the waste in the container (2), to be drawn toward the inside of the enclosure (35) of the condenser (34) by passing through the first pipe (3).

The cooling liquid (16) which falls as a shower (13), condenses the steam contained in the gaseous effluent (22) produced by the food waste (4) by direct contact, then falls into the lower portion of the enclosure (35) of the condenser (34). The possible fraction of incondensable gases is discharged through the incondensable gas extraction opening (37). The condensates mixed with the cooling liquid (16), water for example, are discharged through the condensate extraction opening (36). A portion of the condensates mixed with the cooling liquid (16), contained in the lower portion of the enclosure (35) of the condenser (34), is put back into circulation in the shower device (33) thanks to the condensate recirculation pump (100).

It can happen that the rate of the condensate extraction pump (10) is not sufficient to allow removal of all the liquids comprising the steam that has been condensed and the cooling liquid (16). The level of all the liquid contained in the lower portion of the enclosure (35) of the condenser (34) then rises within the enclosure (35) of the condenser (34), but also in the first pipe (3) which forms an angle α with the longitudinal axis (28) of the enclosure (35) of the condenser (34). This angle α prevents all the liquids from rising toward the container (2). Moreover, when the level of the liquids rises in the enclosure (35) of the condenser (34), this has the effect of reducing the section of the gaseous effluent (22) introduction opening (14) toward the condenser (34). Consequently, the rate of aspiration of the gaseous effluents (22) produced by the food waste (4) is reduced. This has the effect of slowing down the operation of the system (0) until all the liquids are sufficiently discharged so that aspiration can again increase through reduction of the level of the liquids in the enclosure (35) and hence an increase of the section of the aspirating opening (14). This geometric arrangement of the first pipe (3) thus makes it possible to control automatically the flow of the gaseous effluents (22) aspirated from the container (2) toward the enclosure (35) of the condenser (34) by construction, without requiring a control means, electronic for example.

During operation of the system (0), the heat pump (6) can restore (25b) heat at a higher temperature to the container (2) due to the specific condenser (11b), the heat (23, 24) at a lower temperature being recovered by specific heat recovery evaporators (7, 8) attached to the enclosure (35) of the condenser (34) and/or to the second pipe (5). The energy consumption of the system can thus be reduced, for example in proportion to the performance coefficient of the heat pump (6).

Electronic control elements can be used to control the active, mechanical or electrical elements of the system (0) such as the pumps (9, 10, 100), the heat pump (6), the motor (18) of the stirring device, the heating resistor (11a). This control can be determined as a function of the data recovered by the moisture sensor (230) and/or the pressure sensor (231), as well as other sensors, of temperature for example.

The system (0) according to the invention is an effective system (0) with few elements and parts. The system (0) also makes it possible to reduce the number of elements controlled by the electronic control means which are considerable sources of breakdowns. These elements are replaced by forms of construction of the system (0) and by the use of physical phenomena which cannot break down. Moreover, the system (0) makes it possible to save large quantities of energy, for heating for example.

It must be clear to persons skilled in the art that the present invention allows embodiments in many other specific forms without deviating from the scope of application of the invention as claimed. Consequently, the present embodiments must be considered by way of illustration, but can be modified within the field defined by the appended claims, and the invention must not be limited to the details given above.

The invention claimed is:
1. A treatment system (0) intended for dehydrating food waste (4) including at least:
   a storage and heating device (200) for food waste (4) comprising at least one device for stirring food waste (4) in a container (2),
   a condenser (34),
   a first pipe (3) allowing direct communication between the storage device (200) and the condenser (34) to allow passage of gaseous effluents (22) comprising steam produced in the storage and heating device (200) by the food waste (4) toward the condenser (34) where the steam contained in the gaseous effluents are condensed,
   the inside of the container (2), the inside of the enclosure (35) of the condenser (34) and the inside of the first pipe (3) are maintained under primary vacuum,
   wherein the condenser (34) is a direct contact heat exchange condenser (34) having an enclosure (35) comprising an incondensable gas extraction opening (37) in the upper portion of the condenser (34) and a condensate extraction opening (36) in the lower portion of the condenser (34).

2. The system (0) according to claim 1, wherein the direct contact heat exchange condenser (34) is a jet condenser (34) comprising the enclosure (35) having a longitudinal axis (28) perpendicular to the ground (30), the enclosure (35) comprising, in the upper portion of the enclosure (35), a shower device (33) comprising at least one cooling liquid (16) entry opening allowing the cooling liquid (16) to fall as a shower (13) into the enclosure (35), from the upper portion toward the lower portion, the condensate composed of cooling liquid (16) added with steam condensed by the cooling liquid (16) being extracted through the condensate extraction opening, the first pipe (3) leading into the lower portion of the enclosure (35).

3. The system (0) according to claim 2, wherein the incondensable gas extraction opening (37) of the condenser (34) is connected to an incondensable extraction pump (9) and the condensate extraction opening (36) being connected to a condensate extraction pump (10).

4. The system (0) according to claim 2, wherein the shower device (33) communicates with the lower portion of the enclosure (35) of the condenser (34) by a second pipe (5), a portion of the condensate being extracted from the lower portion of the enclosure (35) by a condensate recirculation pump (100) to be led to the shower device (33) by the second pipe (5).

5. The system (0) according to claim 1, wherein the waste storage and heating device (200) further comprises:
   a container (2) intended to contain the food waste (4), the shape of which is partly (2a) a cylindrical sector,
   a heating device (11) positioned against the wall of the container (2) and intended to heat the food waste (4) contained in the container (2).

6. The system (0) according to claim 5, wherein the stirring device comprises at least:
   a rotating shaft (17) driven by a motor (18) and parallel to the longitudinal axis (32) of the cylindrical sector portion (2a) of the container (2),
   a plurality of stems (20) of which one end is attached to the rotating shaft (17),
   a plurality of blades (19) attached to the other end of the stems (20) so that the assembly consisting of one stem (20) and one blade (19) extends from the rotating shaft (17) to the vicinity of the wall of the container (2) shaped as a cylindrical sector.

7. The system (0) according to claim 6, wherein
the longitudinal axis of the container (2) is inclined with respect to the ground (30) and in that each blade (19) is contained in a plane (38) forming an angle δ with the plane (39) comprising the rotating shaft (17) and the stem (20) to which the blade (19) is attached, the orientation of the angle δ being selected so that the food waste (4) intended to be treated in the system (0) are lifted in the direction of the end of the rotating shaft (17) farthest from the ground (30) during treatment of the food waste (4).

8. The system (0) according to claim 1, wherein the heating device comprises heating plates (11a) applied to the outer surface of the container (2), the heating plates being controlled in temperature by a controller.

9. The system (0) according to claim 1, wherein the heating device further comprises a heat pump (6) whereof one specific condenser (11b) is attached to the container (2) and whereof a specific evaporator (7, 8) is attached to the enclosure (35) of the condenser (34), and/or to the second pipe (5) for recovering (23, 24) heat from the enclosure (35) of the condenser (34) and/or from the second pipe (5) to restore the heat (25b) to the container (2).

10. The system (0) according to claim 1, wherein the heating device further comprises a heat pump (6) whereof a specific condenser (11b) is attached to the container (2) and whereof a specific evaporator (7, 8) is inside the enclosure (35) of the condenser (34).

11. The system (0) according to claim 1, wherein the portion (3a) of the first pipe (3) closest to the enclosure (35) of the condenser (34) forms an acute angle α with the longitudinal axis (28) of the enclosure (35).

12. The system (0) according to claim 1, wherein the primary vacuum is maintained by the incondensable gas extraction pump (9) of the condenser (34) and/or by the condensate extraction pump (10).

13. The system (0) according to claim 1, wherein the system (0) further comprises a moisture sensor (230) attached inside the container (2), the sensor being connected to a control means, the control means being connected to the motor (18) configured to drive the rotating shaft (17), the extraction and/or recirculation pump(s) (9, 10, 100), the heating device (11a) and the heat pump (6), the control means configured to stop the motor (18) of the rotating shaft (17), the heating device (11a), the extraction and/or recirculation pump(s) (9, 10, 100) and the heat pump (6) when the sensor detects a level of moisture in the food waste (4) less than a minimum value of the moisture level in the container (2).

14. The system (0) according to claim 1, wherein the system (0) comprises at least one pressure sensor (231) in the container (2) and/or in the enclosure (35) of the condenser (34), the sensor(s) (231) being connected to the control means, the control means being connected to at least one extraction pump, the control means configured to control the operation of the extraction pump(s) (9, 10) to maintain the primary vacuum of the system (0) and/or to discharge the condensates (16).

15. The system (0) according claim 1, wherein the container (2) has a discharge opening (400) in the portion closest to the ground (30).

16. The system (0) according to claim 1, wherein cutters are attached to the rotating shaft (17).

* * * * *